United States Patent
Wu et al.

(10) Patent No.: US 12,116,891 B1
(45) Date of Patent: Oct. 15, 2024

(54) CALCULATION METHOD FOR MOBILE FLUID SATURATION AFTER RESERVOIR FRACTURING BASED ON NETTING ANALYSIS

(71) Applicant: Southwest Petroleum University, Sichuan (CN)

(72) Inventors: Feng Wu, Sichuan (CN); Chunchao Chen, Sichuan (CN); Ao Wang, Sichuan (CN); Yujing Long, Sichuan (CN); Siyuan Chen, Sichuan (CN); Yingying Luo, Sichuan (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 18/616,109

(22) Filed: Mar. 25, 2024

(30) Foreign Application Priority Data

May 4, 2023 (CN) .......................... 202310485930.X

(51) Int. Cl.
*E21B 49/08* (2006.01)
*E21B 43/26* (2006.01)

(52) U.S. Cl.
CPC ............ *E21B 49/088* (2013.01); *E21B 43/26* (2013.01); *E21B 2200/20* (2020.05)

(58) Field of Classification Search
CPC ..... E21B 49/088; E21B 43/26; E21B 2200/20
USPC ...................................................... 73/152.27
See application file for complete search history.

(56) References Cited

U.S. PATENT DOCUMENTS

2013/0261972 A1* 10/2013 Al Adani ................. G01V 3/34
702/7

FOREIGN PATENT DOCUMENTS

| CN | 101929973 A | 12/2010 |
| CN | 112459754 A | 3/2021 |
| CN | 115434698 A | 12/2022 |
| CN | 115713049 A | 2/2023 |

* cited by examiner

*Primary Examiner* — Nathaniel T Woodward

(57) ABSTRACT

Disclosed is a calculation method for a mobile fluid saturation after reservoir fracturing based on netting analysis, including: performing a fracturing experiment and micro-computed tomography (CT) experiment designs before and after fracturing; dividing a pore development area and a dense area; comparing micro-CT scanning experimental images of the same reservoir core sample before and after fracturing, and dividing a fracture network formed after fracturing; analyzing the propagation of fracturing fractures by netting analysis; determining a porosity of fracturing reconstruction; further determining a mobile fluid saturation after fracturing; and combining with a logging curve to realize the continuous calculation of mobile fluid saturation after fracturing. According to the present disclosure, on the basis of micro-CT scanning data before and after fracturing, the mobile fluid saturation after fracturing is quantitatively calculated by netting analysis and logging curves to cause the evaluation of the mobile fluid saturation after fracturing to be more accurate.

8 Claims, 9 Drawing Sheets

CALCULATION METHOD FOR MOBILE FLUID SATURATION AFTER RESERVOIR FRACTURING BASED ON NETTING ANALYSIS

CROSS-REFERENCE TO RELATED APPLICATIONS

This application claims priority of Chinese Patent Application No. 202310485930.X, filed on May 4, 2023, the entire contents of which are incorporated herein by reference.

TECHNICAL FIELD

The present disclosure relates to the technical field of oil and natural gas exploration and development, and in particular to a calculation method for a mobile fluid saturation after reservoir fracturing based on netting analysis.

BACKGROUND

With the increasing demand for oil-gas resources, the main battlefield of oil-gas exploration and development has changed from conventional to unconventional fields, and the tight oil-gas has become the hot spot and focus of unconventional oil-gas exploration and development at present and in the future. Due to the complex pore structure of tight reservoirs, it not only affects the occurrence of oil-gas, but also seriously restricts the oil-gas seepage and efficient exploitation. In this regard, the development of tight reservoirs generally requires increasing production through hydraulic fracturing, and the mobile fluid saturation can effectively evaluate the storage and production characteristics of oil-gas reservoirs and their final development.

The mobile fluid saturation before fracturing is mainly evaluated by experiments such as a high-pressure mercury injection experiment, constant-speed mercury injection experiment, nuclear magnetic resonance test and core relative permeability experiment. However, there are a large number of unconventional reservoirs at present, and the hydraulic fracturing is needed to increase production. Since multiple micro-fractures will be generated in the core after fracturing, the displacement or centrifugal experiment will further destroy the structure of rock, resulting in experimental results of mobile fluid saturation after fracturing obtained by conventional experiments to be inconsistent with those in the actual situation. Therefore, some conventional methods for evaluating the mobile fluid saturation before fracturing are not suitable for evaluating the mobile fluid saturation after fracturing.

On the whole, there is no mature method for evaluating the mobility of fluids after fracturing, so the development of a calculation method for a mobile fluid saturation after reservoir fracturing has great significance and broad prospects in the exploration and development of tight reservoirs.

SUMMARY

An object of the present disclosure is to provide a calculation method for a mobile fluid saturation after reservoir fracturing based on netting analysis in view of the fact that there is no effective method for calculating a mobile fluid saturation after fracturing of tight reservoirs in the process of exploration and development of tight reservoirs. On the basis of the micro-computed tomography (CT) scanning data before and after fracturing, a mobile fluid saturation after fracturing is quantitatively calculated by netting analysis, and then combined with the characteristics of a logging curve to carry out analysis to calculate the mobile fluid saturation after fracturing through the logging curve, so that the evaluation of mobile fluid saturation after fracturing in tight oil-gas reservoirs is more accurate and efficient, and the exploration and development of tight oil-gas reservoirs are better guided.

In order to achieve the above object, the present disclosure provides the following solutions.

A calculation method for a mobile fluid saturation after reservoir fracturing based on netting analysis includes the following steps:

performing a fracturing experiment and micro-CT experiment designs before and after fracturing on a reservoir core sample;

dividing a pore development area and a dense area for the reservoir core sample;

comparing micro-CT scanning experimental images of the same reservoir core sample before and after fracturing, and dividing a fracture network formed after fracturing;

analyzing the propagation of fracturing fractures by netting analysis on the basis of the fracture network;

determining a porosity of fracturing reconstruction on the basis of the number of grids passed by the fracturing fractures and the number of grids contained in the pore development area;

further determining a mobile fluid saturation after fracturing on the basis of the porosity of fracturing reconstruction; and combining with a logging curve to realize the continuous calculation of mobile fluid saturation after fracturing.

Further, the performing a fracturing experiment and micro-CT experiment designs before and after fracturing on a reservoir core sample includes:

sample selection and preparation: selecting a tight oil-gas reservoir section core as a reservoir core sample, and drilling the tight oil-gas reservoir section core into a cylinder with a set size, two end faces of the cylinder being flat and perpendicular to an axis;

a micro-CT scanning experiment before fracturing: acquiring an internal morphology and an internal microstructure of the core before fracturing through the micro-CT scanning experiment;

a fracturing experiment: simulating a formation hydraulic fracturing experiment through a laboratory triaxial rock mechanics experiment, and stopping pressing when a stress drops to a set range; and a micro-CT scanning experiment after fracturing: acquiring an internal morphology and an internal microstructure of the core after fracturing through the micro-CT scanning experiment.

Further, the micro-CT scanning experiment after fracturing meets the following conditions:

a) the use of the same instrument as that used for the micro-CT scanning experiment before fracturing;

b) during the experiment, the direction and position of core placement to be consistent with those in the scanning before fracturing; and c) the selection of scanning resolution to be consistent with a scanning resolution before fracturing.

Further, the fracturing experiment: simulating a formation hydraulic fracturing experiment through a laboratory triaxial rock mechanics experiment, and stopping pressing when a stress drops to a set range specifically includes:

wrapping the reservoir core sample with a thermoplastic film and putting a wrapped reservoir core sample into a triaxial mechanical experiment tester when the triaxial rock mechanics experiment is carried out, an experimental confining pressure being set to $\sigma_3 = P_f$ if a formation pressure of a depth section where a test core is located is $P_f$ when a triaxial rock mechanics test is carried out; and dividing an axial strain curve into several segments according to curve characteristics, an OA segment belonging to elastic deformation; a stress-strain relationship in an AB segment basically being linear, and a strain being completely recovered after stress unloading; in a BC segment, the curve deviating from linearity and plastic deformation occurring; and in a CD segment, an interior of the rock having an accelerated crack formation speed and an increased crack density, at this time, an axial pressure being slowly applied, a stress-strain curve output by software being observed simultaneously, the axial strain curve reaching a maximum stress at point D, being the maximum bearing capacity of rock, and the stress at this time being recorded as $\sigma_{max}$; and stopping pressing when the stress drops by $1/6\sigma_{max} - 1/5\sigma_{max}$.

Further, the dividing a pore development area and a dense area for the reservoir core sample includes:
optimizing the micro-CT scanning experimental image of the reservoir core sample before fracturing;
transforming the micro-CT scanning experimental image before fracturing into a gray-scale image, and determining a segmentation threshold point to extract the information of pore space and rock skeleton;
determining a ratio of a pixel value occupied by all pores in a scanning area to a pixel value of the whole scanning area as a surface porosity of the area; and
dividing an area with a surface porosity $\Phi_{ap} < 3\%$ in the scanning area into a dense area, and dividing an area with a surface porosity $\Phi_{ap} \geq 3\%$ in the scanning area into a pore development area.

Further, the transforming the micro-CT scanning experimental image before fracturing into a gray-scale image, and determining a segmentation threshold point to extract the information of pore space and rock skeleton includes:
transforming the micro-CT scanning experimental image before fracturing into a gray-scale image, which is divided into 256 gray-scale values from 0 to 255;
segmenting pores in the micro-CT scanning experimental image before fracturing from a rock skeleton and a cement to cause a ratio of porosity pixels to total pixels in the segmented core image to be equal to a core porosity, a calculation formula of the selected segmentation threshold point when the pore space is extracted being shown in Formula (1):

$$f(n) = \frac{\Phi}{100} - \frac{\sum_{i=0}^{n} p(i)}{\sum_{i=0}^{255} p(i)} \quad (1)$$

where, $f(n)$ is a discriminant formula of a segmentation threshold, a value of n being expressed as a gray-scale threshold segmentation point if $f(n)=0$; $\Phi$ is a core test porosity (%); i is a gray-scale value; and p(i) is the number of pixels with a gray-scale value of i.

Further, the analyzing the propagation of fracturing fractures by netting analysis on the basis of the fracture network includes:
selecting a certain tangent plan view of micro-CT scanning after fracturing;
dividing the tangent plan view into a plurality of micro-units with equal sizes by a square grid with a side length of 1 mm;
scanning each grid by line with a step length of 1 mm according to the divided grids; and
scanning the surrounding 3 mm×3 mm area with a total of 9 grids by taking a grid to be scanned as a center when each grid is scanned, a ratio of a pixel value occupied by all pores in the scanning area to a pixel value of the whole scanning area being a surface porosity of the area, and a calculation formula being shown in Formula (2):

$$\Phi_{ap} = \frac{N_\phi}{N} \times 100\% \quad (2)$$

where, $\Phi_{ap}$ is an area surface porosity (%), N is a sum of pixels in the selected area (dimensionless), and $N_\phi$ is a sum of pixels occupied by pore space in the selected area (dimensionless),
the scanned grids belonging to the pore development area being determined if the surface porosity in the scanning area is $\Phi_{ap} > 3\%$, and the scanned grids belonging to the dense area being determined if the surface porosity in the scanning area is $\Phi_{ap} \leq 3\%$ until all areas are scanned; and
observing a micro-CT scanning image after fracturing, and drawing out the propagation of fracturing fractures in the core.

Further, the determining a porosity of fracturing reconstruction on the basis of the number of grids passed by the fracturing fractures and the number of grids contained in the pore development area includes:
uniformly recording a grid with an area of <0.5 mm² as 0 and a grid with an area of >0.5 mm² as 1 in the subsequent calculation because many incomplete grids exist on an edge after grid division,
the porosity of fracturing reconstruction being a ratio of the number of grids passed by the fracturing fractures to the number of grids contained in the pore development area multiplied by the core test porosity, expressed as:

$$\Phi_{frac} = \frac{N_{frac}}{N_{loose}} \times \Phi \quad (3)$$

where, $\Phi_{frac}$ is a porosity of fracturing reconstruction (%); $N_{frac}$ is the number of grids passed by the fracturing fractures; $N_{loose}$ is the number of grids contained in the pore development area; and $\Phi$ is a core test porosity (%).

Further, the further determining a mobile fluid saturation after fracturing on the basis of the porosity of fracturing reconstruction includes:
calculation formulas of the mobile fluid saturation after fracturing shown in Formulas (4) and (5):

$$\Delta SWM = \frac{\Phi_{frac}}{\Phi} \times (SWM_F - SWM) \quad (4)$$

$$SWM_{frac} = SWM + \Delta SWM \quad (5)$$

where, ΔSWM is an increment of the mobile fluid saturation after fracturing calculated by netting analysis (%); SWM is a mobile fluid saturation before fracturing acquired by a nuclear magnetic resonance experiment (%); $SWM_{frac}$ is the mobile fluid saturation after fracturing calculated by netting analysis (%); since the fractures may not transform all immobile fluids in the pore space into mobile fluids due to the presence of a bound water membrane in the pore space, $SWM_F$ indicates a proportion of fluids in a reconstructable pore space when the fractures pass through, taking $SWM_F$=90%; $\Phi_{frac}$ is a porosity of fracturing reconstruction (%); and $\Phi$ is a core test porosity (%).

Further, the combining with a logging curve to realize the continuous calculation of mobile fluid saturation after fracturing includes:

performing multivariate fitting on the mobile fluid saturation before fracturing with a reservoir quality factor through the porosity and permeability, as shown in Formula (6):

$$SWM1 = \alpha \ln(\Phi) + b \ln(K) + c\left(\sqrt{\frac{K}{\Phi}}\right)^x + d \tag{6}$$

the increment of mobile fluid saturation after fracturing being directly related to a brittleness index, expressed by Formula (7):

$$\Delta SWM1 = mBI + n \tag{7}$$

the mobile fluid saturation after fracturing being calculated by adding the mobile fluid saturation before fracturing and the increment of mobile fluid saturation after fracturing, as shown in Formula (8):

$$SWM_{frac1} = SWM1 + \Delta SWM1 \tag{8}$$

where, SWM1 is a mobile fluid saturation before fracturing calculated by logging (%); $\Phi$ is a core test porosity (%); K is a core test permeability (mD); BI is a brittleness index; $SWM_{frac1}$ is a mobile fluid saturation after fracturing calculated by logging (%); ΔSWM1 is an increment of the mobile fluid saturation after fracturing calculated by logging (%); and a, b, c, d, m and n are fitting formula coefficients.

According to the specific examples provided by the present disclosure, the following technical effects are disclosed: the calculation method for a mobile fluid saturation after reservoir fracturing based on netting analysis provided by the present disclosure is simple and includes performing a fracturing experiment and micro-CT experiment designs before and after fracturing; dividing a pore development area and a dense area; comparing micro-CT scanning experimental images of the same core before and after fracturing, and dividing a fracture network formed after fracturing; analyzing the propagation of fracturing fractures by netting analysis; calculating a porosity of fracturing reconstruction through the number of grids passed by the fractures and the number of grids contained in the pore development area; further calculating a mobile fluid saturation after fracturing through the porosity of fracturing reconstruction; and combining with a logging curve to realize the continuous calculation of mobile fluid saturation after fracturing. It can be seen that in the present disclosure, on the basis of the micro-CT scanning data before and after fracturing, a mobile fluid saturation after fracturing is quantitatively calculated by netting analysis, and then combined with the characteristics of a logging curve to carry out analysis to calculate the mobile fluid saturation after fracturing through the logging curve, so that the evaluation of mobile fluid saturation after fracturing in tight oil-gas reservoirs is more accurate and efficient, and the exploration and development of tight oil-gas reservoirs are better guided.

BRIEF DESCRIPTION OF THE DRAWINGS

In order to explain the technical solutions in the examples of the present disclosure or the related art more clearly, the attached drawings needed in the examples will be briefly introduced below. Obviously, the attached drawings in the following description are only examples of the present disclosure, and other drawings can be obtained according to the provided drawings without creative efforts for those of ordinary skill in the art.

DETAILED DESCRIPTION

Technical solutions in the examples of the present disclosure will be described clearly and completely in the following with reference to the attached drawings in the examples of the present disclosure. Obviously, all the described examples are only some, rather than all examples of the present disclosure. Based on the examples in the present disclosure, all other examples obtained by those of ordinary skill in the art without creative efforts belong to the scope of protection of the present disclosure.

The present disclosure provides a calculation method for a mobile fluid saturation after reservoir fracturing based on netting analysis in view of the fact that there is no effective method for calculating a mobile fluid saturation after fracturing of tight reservoirs in the process of exploration and development of tight reservoirs. On the basis of the micro-CT scanning data before and after fracturing, a mobile fluid saturation after fracturing is quantitatively calculated by netting analysis, and then combined with the characteristics of a logging curve to carry out analysis to calculate the mobile fluid saturation after fracturing through the logging curve, so that the evaluation of mobile fluid saturation after fracturing in tight oil-gas reservoirs is more accurate and efficient, and the exploration and development of tight oil-gas reservoirs are better guided.

In order to make the above objects, features and advantages of the present disclosure more obvious and easy to understand, in the following, the present disclosure will be further explained in detail with the attached drawings and specific examples.

Figure 1:
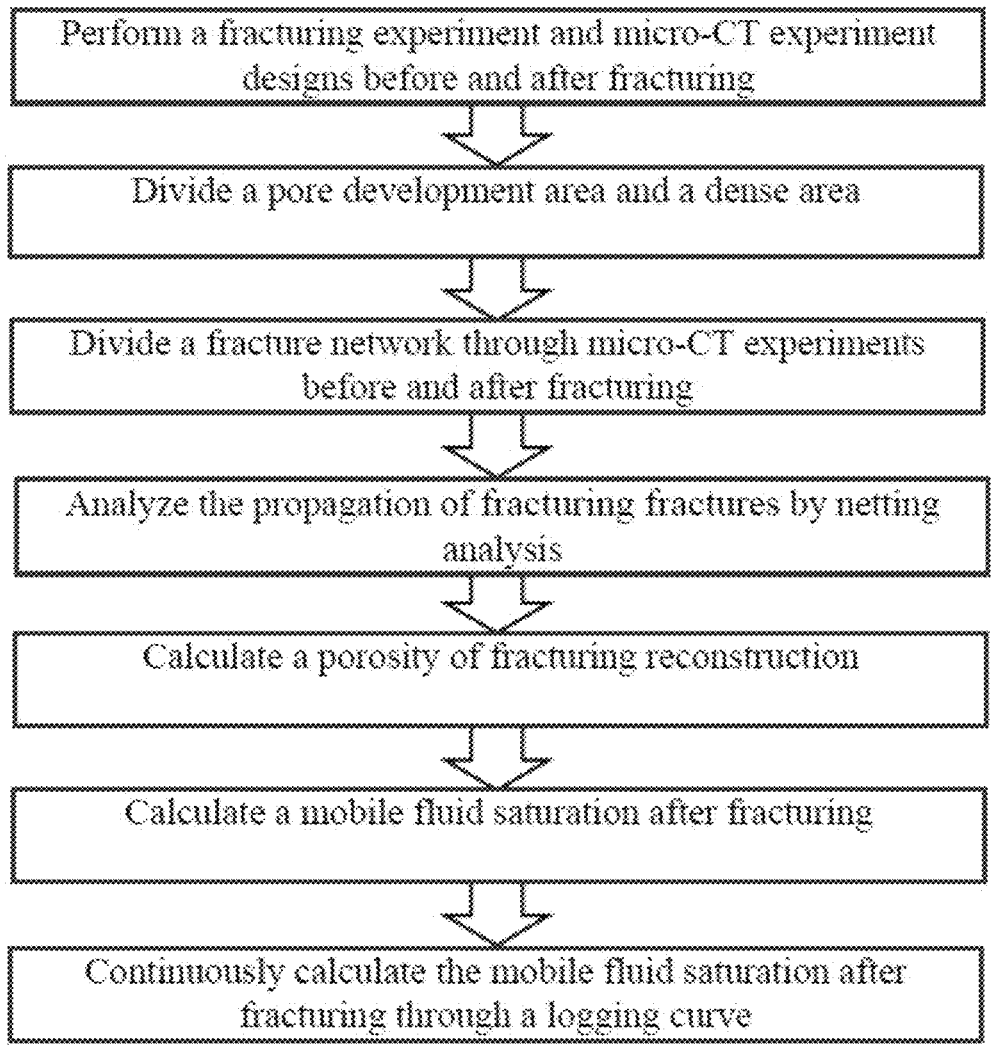
FIG. 1 is a flow chart of a calculation method for a mobile fluid saturation after reservoir fracturing based on netting analysis according to the present disclosure.

As shown in FIG. 1, a calculation method for a mobile fluid saturation after reservoir fracturing based on netting analysis provided by the present disclosure includes the following steps.

At S1, a fracturing experiment and micro-CT experiment designs before and after fracturing are performed on a reservoir core sample.

At S2, for the reservoir core sample, a pore development area and a dense area are divided.

At S3, micro-CT scanning experimental images of the same reservoir core sample before and after fracturing are compared, and a fracture network formed after fracturing is divided.

At S4, the propagation of fracturing fractures is analyzed by netting analysis on the basis of the fracture network.

At S5, a porosity of fracturing reconstruction is determined on the basis of the number of grids passed by the fracturing fractures and the number of grids contained in the pore development area.

At S6, a mobile fluid saturation after fracturing is further determined on the basis of the porosity of fracturing reconstruction.

At S7, a logging curve is combined to realize the continuous calculation of mobile fluid saturation after fracturing.

Figure 2:
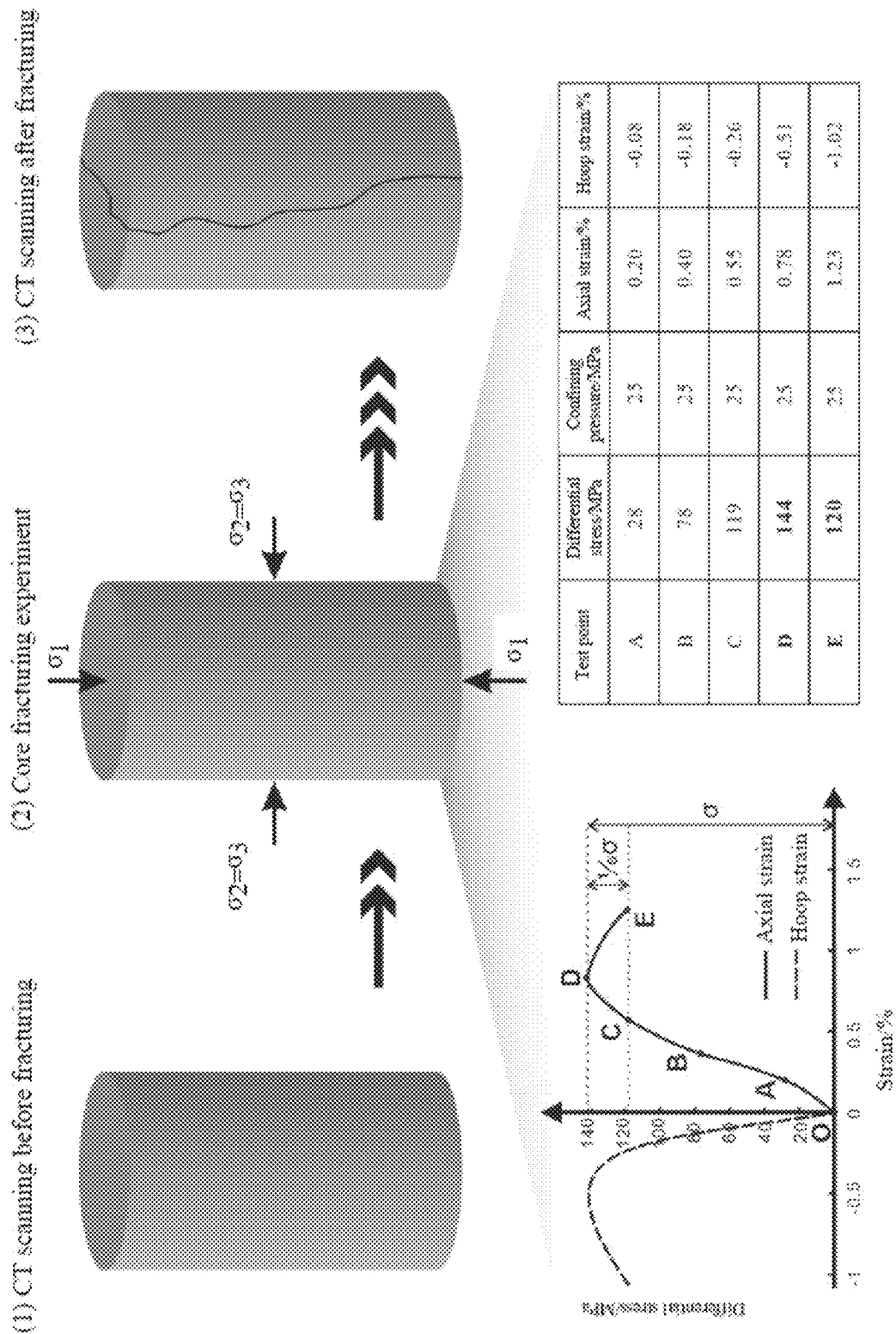
FIG. 2 is a schematic diagram of a fracturing experiment and micro-CT scanning experimental designs before and after fracturing according to the present disclosure.

As shown in FIG. 2, the step S1, a fracturing experiment and micro-CT experiment designs before and after fracturing being performed on a reservoir core sample specifically includes the following steps.

(1) Sample Selection and Preparation

A tight oil-gas reservoir section core is selected as an experimental sample, and the core is drilled into a cylinder with a diameter of 2.5 cm and a length of 4-6 cm, two end faces of the cylinder being flat and perpendicular to an axis.

(2) Micro-CT Scanning Experiment Before Fracturing

The internal morphology and internal microstructure of the core can be mainly acquired by a micro-CT scanning experiment before fracturing. The pore structure and natural fracture development of the core in an original state of the formation can be observed, facilitating the comparative analysis with experimental results after fracturing.

In the micro-CT scanning experiment, it is necessary to select a scanning resolution within a range of 8-12 μm/pixel, and images scanned in this range can realize the comprehensive and fine scanning of the whole sample, and at the same time, the propagation law of the fractures generated by fracturing can be clearly observed, facilitating the accurate extraction and quantitative evaluation of the fracturing fractures.

(3) Fracturing Experiment

A formation hydraulic fracturing experiment is simulated through a laboratory triaxial rock mechanics experiment. The experimental sample, after being wrapped with a thermoplastic film, is put into a triaxial mechanical experiment tester when the triaxial rock mechanics experiment is carried out, an experimental confining pressure being set to $\sigma_3 = P_f$ if a formation pressure of a depth section where a test core is located is $P_f$ when a triaxial rock mechanics test is carried out. An axial strain curve is divided into several segments according to curve characteristics. An OA segment belongs to elastic deformation; a stress-strain relationship in an AB segment basically is linear, and a strain is completely recovered after stress unloading; in a BC segment, the curve deviates from linearity and plastic deformation occurs; and in a CD segment, an interior of the rock has an accelerated crack formation speed and an increased crack density, at this time, an axial pressure is slowly applied, a stress-strain curve output by software is observed simultaneously, the axial strain curve reaches a maximum stress at point D, being the maximum bearing capacity of rock, and the stress at this time is recorded as $\sigma_{max}$; and the pressing is stopped when the stress drops by $1/6\sigma_{max}$-$1/5\sigma_{max}$. In this state, it can ensure that there are fracturing fractures in the core but the core is not damaged, facilitating the carryout of micro-CT scanning experiment after fracturing.

(4) Micro-CT Scanning Experiment after Fracturing

After the core has been fractured, the micro-CT scanning experiment after fracturing can be performed. The following conditions need to be met for performing micro-CT scanning after fracturing: a) the use of the same instrument as that used for the micro-CT scanning experiment before fracturing; b) during the experiment, the direction and position of core placement to be consistent with those in the scanning before fracturing; and c) the selection of scanning resolution to be consistent with a scanning resolution before fracturing. Under this condition, micro-CT scanning images before and after fracturing at the same position can be accurately compared, facilitating the extraction of fracturing fractures.

The internal homogeneity of tight sandstone reservoirs is poor, and some reservoir sections contain a large amount of gravel or cementitious filling pores, which are ineffective reservoir spaces, collectively referred to as dense areas. Through the observation and analysis of a large number of CT scanning data, it is found that after fracturing, the fractures generally pass through the pore development area and bypass the dense area to propagate, and the fractures also communicate with some of immobile fluids in the pore development area to realize the effective development of tight reservoirs. In order to accurately calculate a pore space volume of fracturing fracture reconstruction, it is necessary to accurately divide the dense area and pore development area.

Figure 3:
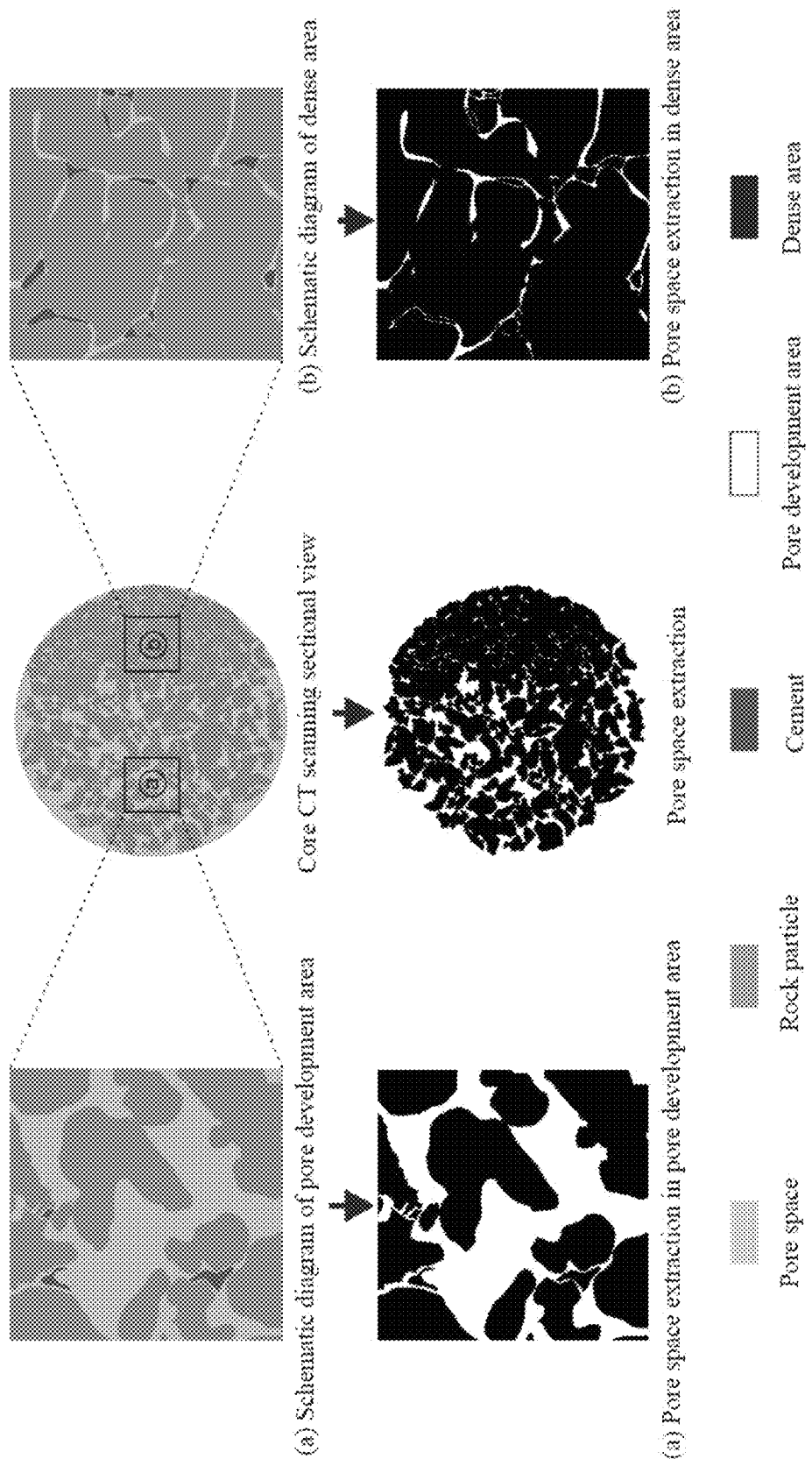
FIG. 3 is a schematic diagram of image pore space extraction according to the present disclosure.

Therefore, as shown in FIG. 3, the step S2, for the reservoir core sample, a pore development area and a dense area being divided, specifically includes:

pores are extracted by image numerical processing to calculate a surface porosity. The specific processing steps are as follows:

(1) CT scanning image optimization: a gray-scale image acquired by the core micro-CT scanning can be represented by 256 gray-scale values, pixel values of pixel points and eight adjacent pixel points thereabout in a digital image are selected, these pixel values are sorted in an ascending order, and then a pixel value located at a middle position is taken as a pixel value of a current pixel point to cause the surrounding pixel values to be close to real values to perform optimization processing on the image, thereby eliminating isolated noise points and improving the contrast and clarity of pictures.

(2) Pore space extraction: the information of pore space and rock skeleton is extracted through the determination of threshold, and a pore part in the image is segmented. The image is transformed into a gray-scale image, which is divided into 256 gray-scale values from 0 to 255; pores in a CT scanning gray-scale image are segmented from the rock skeleton and cement to cause a ratio of porosity pixels to total pixels in the segmented core image to be equal to a core porosity, ensuring the reliability of segmentation results. A calculation formula for the selected segmentation threshold point when a pore space is extracted is shown in Formula (1):

$$f(n) = \frac{\Phi}{100} - \frac{\sum_{i=0}^{n} p(i)}{\sum_{i=0}^{255} p(i)} \quad (1)$$

where, f(n) is a discriminant formula of a segmentation threshold, a value of n being expressed as a gray-scale threshold segmentation point if f(n)=0; $\Phi$ is a core test porosity (%); i is a gray-scale value (dimensionless); and p (i) is the number of pixels with a gray-scale value of i (dimensionless).

(3) Calculation of surface porosity of scanning area: a ratio of a pixel value occupied by all pores in the scanning area to a pixel value of the whole scanning area is a surface porosity of the area, and a calculation formula is shown in Formula (2):

$$\Phi_{ap} = \frac{N_\phi}{N} \times 100\% \quad (2)$$

where, $\Phi_{ap}$ is an area surface porosity (%), N is a sum of pixels in the selected area (dimensionless), and $N_\phi$ is a sum of pixels occupied by pore space in the selected area (dimensionless).

(4) Division of dense area and pore development area: an area with a surface porosity $\Phi_{ap}$<3% in the scanning area is divided into a dense area, and an area with a surface porosity $\Phi_{ap}$≥3% in the scanning area is divided into a pore development area.

Figure 4:
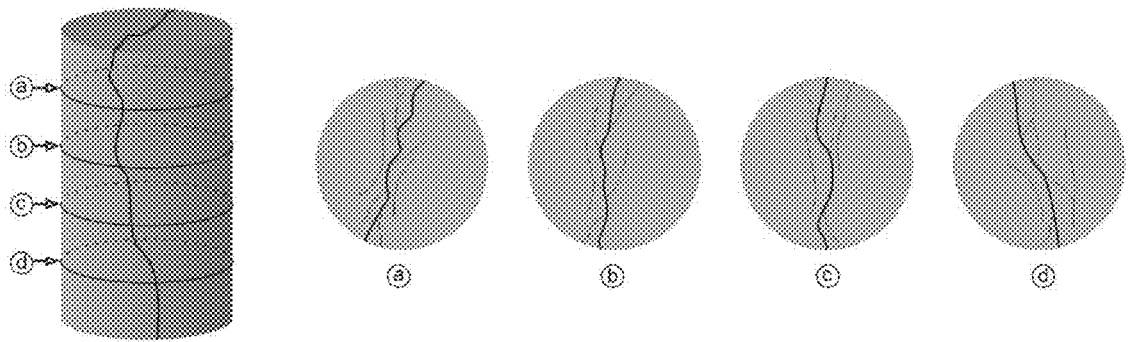
FIG. 4 is a fracture network propagation trend diagram according to the present disclosure.

As shown in FIG. 4, the step S3, micro-CT scanning experimental images of the same reservoir core sample before and after fracturing being compared, and a fracture network formed after fracturing being divided, specifically includes:

The micro-CT scanning can perform three-dimensional imaging on the core and show arbitrary tangent planes at different positions. The pore structure and micro-fracture development of the core in an original state of the formation are observed by the micro-CT scanning before core fracturing. The formation hydraulic fracturing is simulated by the triaxial rock mechanics experiment. After the completion of experiment, the rock sample is taken out and the micro-CT scanning is performed again on the rock sample to determine the fracture propagation after fracturing. Finally, micro-CT images of rock sample before and after fracturing are compared to determine whether the fracture is a natural fracture or fracturing fracture, facilitating the accurate extraction of the fracture network formed by hydraulic fracturing reconstruction. When the fracture network of fracturing fractures is extracted, scanning photographs of the core at a, b, c, and d of longitudinal quintile points are selected, images near where a diameter of a circular slice is passed by the main fracture are selected, a propagation area of the fracture network of fracturing fractures in each slice is calculated by netting analysis, a mobile fluid saturation of a corresponding point is further calculated, and finally the statistical average is performed.

Figure 5:
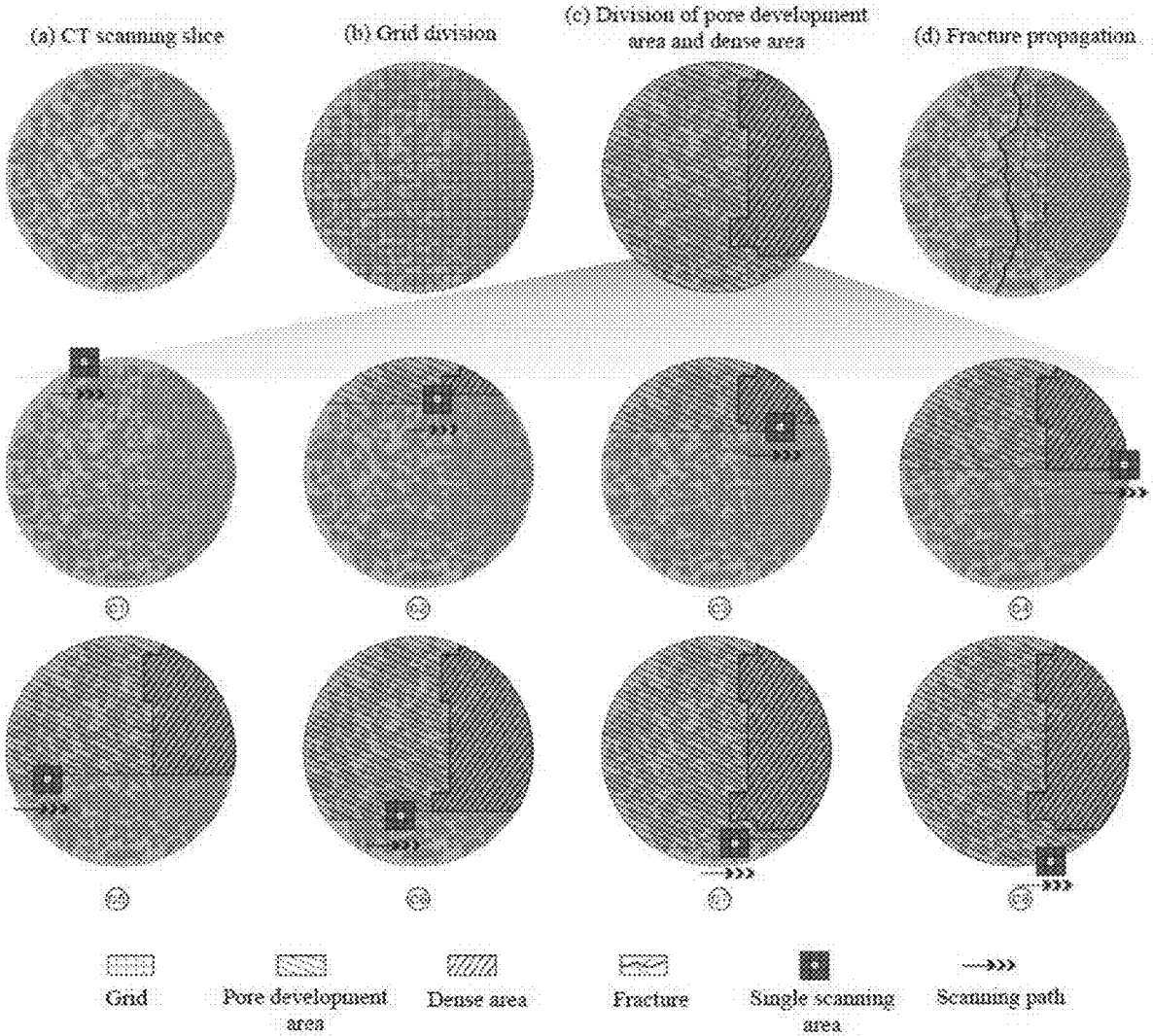
FIG. 5 is a flow chart of the analysis of fracturing fracture propagation by netting analysis according to the present disclosure.

As shown in FIG. 5, the step S4, the propagation of fracturing fractures being analyzed by netting analysis on the basis of the fracture network, specifically includes:

at (1): a certain tangent plane view of CT scanning is selected;

at (2): the core tangent plane is divided into a plurality of micro-units with equal sizes by a square grid with a side length of 1 mm;

at (3): each grid is scanned by line with a step length of 1 mm according to the divided grids; and the surrounding 3 mm×3 mm area with a total of 9 grids are scanned by taking a grid to be scanned as a center when each grid is scanned, the scanned grids belonging to the pore development area being determined if the surface porosity in the scanning area is $\Phi_{ap}$>3%, and the scanned grids belonging to the dense area being determined if the surface porosity in the scanning area is $\Phi_{ap}$≤3% until all areas are scanned; and at (4): a micro-CT scanning image after fracturing is observed, and the propagation of fracturing fractures in the core is drawn out.

Specifically, the step S5, a porosity of fracturing reconstruction being determined on the basis of the number of grids passed by the fracturing fractures and the number of grids contained in the pore development area, specifically includes:

a grid with an area of <0.5 mm² is uniformly recorded as 0 and a grid with an area of >0.5 mm² as 1 in the subsequent calculation because many incomplete grids exist on an edge after grid division. A porosity of fracturing reconstruction is a ratio of the number of grids passed by the fracturing fractures to the number of grids of the pore development area multiplied by a core test porosity. A calculation formula is shown in Formula (3):

$$\Phi_{frac} = \frac{N_{frac}}{N_{loose}} \times \Phi \quad (3)$$

where, $\Phi_{frac}$ is a porosity of fracturing reconstruction (%); $N_{frac}$ is the number of grids passed by the fracturing fractures (dimensionless); $N_{loose}$ is the number of grids passed by the pore development area (dimensionless); and $\Phi$ is a core test porosity (%).

Specifically, the step S6, a mobile fluid saturation after fracturing being further determined on the basis of the porosity of fracturing reconstruction, includes:

calculation formulas of the mobile fluid saturation after fracturing shown in Formulas (4) and (5):

$$\Delta SWM = \frac{\Phi_{frac}}{\Phi} \times (SWM_F - SWM) \quad (4)$$

$$SWM_{frac} = SWM + \Delta SWM \quad (5)$$

where, $\Delta SWM$ is an increment of the mobile fluid saturation after fracturing calculated by netting analysis (%); SWM is a mobile fluid saturation before fracturing acquired by a nuclear magnetic resonance experiment (%); $SWM_{frac}$ is the mobile fluid saturation after fracturing calculated by netting analysis (%); since the fractures may not transform all immobile fluids in the pore space into mobile fluids due to the presence of a bound water membrane in the pore space, $SWM_F$ indicates a proportion of fluids in a reconstructable pore space when the fractures pass through, taking $SWM_F$=90%; $\Phi_{frac}$ is a porosity of fracturing reconstruction (%); and $\Phi$ is a core test porosity (%).

Specifically, the step S7, a logging curve being combined to realize the continuous calculation of mobile fluid saturation after fracturing, includes:

a mobile fluid saturation after fracturing of the formation where the core is sampled can be acquired by netting analysis. If a continuous mobile fluid saturation after fracturing of the formation is to be acquired, it is necessary to link the experimental data with the characteristics of a logging curve, to realize the logging calculation of mobile fluid saturation after fracturing.

The multivariate fitting is performed on the mobile fluid saturation before fracturing with a reservoir quality factor through the porosity and permeability, as shown in Formula (6):

$$SWM1 = a\ \ln(\Phi) + b\ \ln(K) + c\left(\sqrt{\frac{K}{\Phi}}\right)^x + d \qquad (6)$$

the increment of mobile fluid saturation after fracturing being directly related to a brittleness index, expressed by Formula (7):

$$\Delta SWM1 = mBI + n \qquad (7)$$

the mobile fluid saturation after fracturing being calculated by adding the mobile fluid saturation before fracturing and the increment of mobile fluid saturation after fracturing, as shown in Formula (8):

$$SWM_{frac1} = SWM1 + \Delta SWM1 \qquad (8)$$

where, SWM1 is a mobile fluid saturation before fracturing calculated by logging (%); $\Phi$ is a core test porosity (%); K is a core test permeability (mD); BI is a brittleness index (dimensionless); $SWM_{frac1}$ is a mobile fluid saturation after fracturing calculated by logging (%); $\Delta$ SWM1 is an increment of the mobile fluid saturation after fracturing calculated by logging (%); and a, b, c, d, m and n are fitting formula coefficients.

A mobile fluid saturation after fracturing is calculated by the method of the present disclosure, a well section with higher mobile fluid saturation after fracturing is selected for fracturing construction, and daily oil-gas production tests before and after fracturing are performed on the well section. The test results show that: before fracturing, the well section basically has no productivity; and after fracturing, the well section has a daily oil production of 12.7 m³ and a daily gas production of 20,680 m³, with a remarkable fracturing effect.

In a specific example, taking a certain tight oil-gas reservoir at sea as an example, the relevant experiments and analysis are carried out in well A at 4592 m. A serial number of core is No. 1, and the basic data of the core are shown in Table 1.

I. Experimental Designs (1) A reservoir section core in Well A at 4592 m is selected as an experimental sample, and a serial number is set as No. 1. The core is drilled into a cylinder with a diameter of 2.50 cm and a length of 4.80 cm, two end faces of the cylinder being perpendicular to an axis.

(2) The prepared core is put into a micro-CT scanner with a scanning resolution of 10 μm/pixel, and the micro-CT scanning before fracturing is performed. The pore structure characteristics and micro-fracture development of a tangent plane are observed after scanning.

(3) The experimental sample, after being wrapped with a thermoplastic film, is put into a triaxial rock mechanics experimental instrument. According to the pressure measurement data, a formation pressure $P_f$ is determined to be 25 MPa, an experimental confining pressure $\sigma_3$ is selected as 25 MPa, and an axial pressure is slowly applied. At the same time, a stress-strain curve output by software is observed, a differential stress value at the highest point of the strain curve is recorded as $\sigma_{max}$=181.8 MPa. When a differential stress σ drops to about $5/6\sigma_{max}$ (0=151.5 MPa), the axial pressure and confining pressure are withdrawn in time, the axial displacement is stopped and the core is taken out. At this time, fracturing fractures have appeared in the core.

Figure 6:
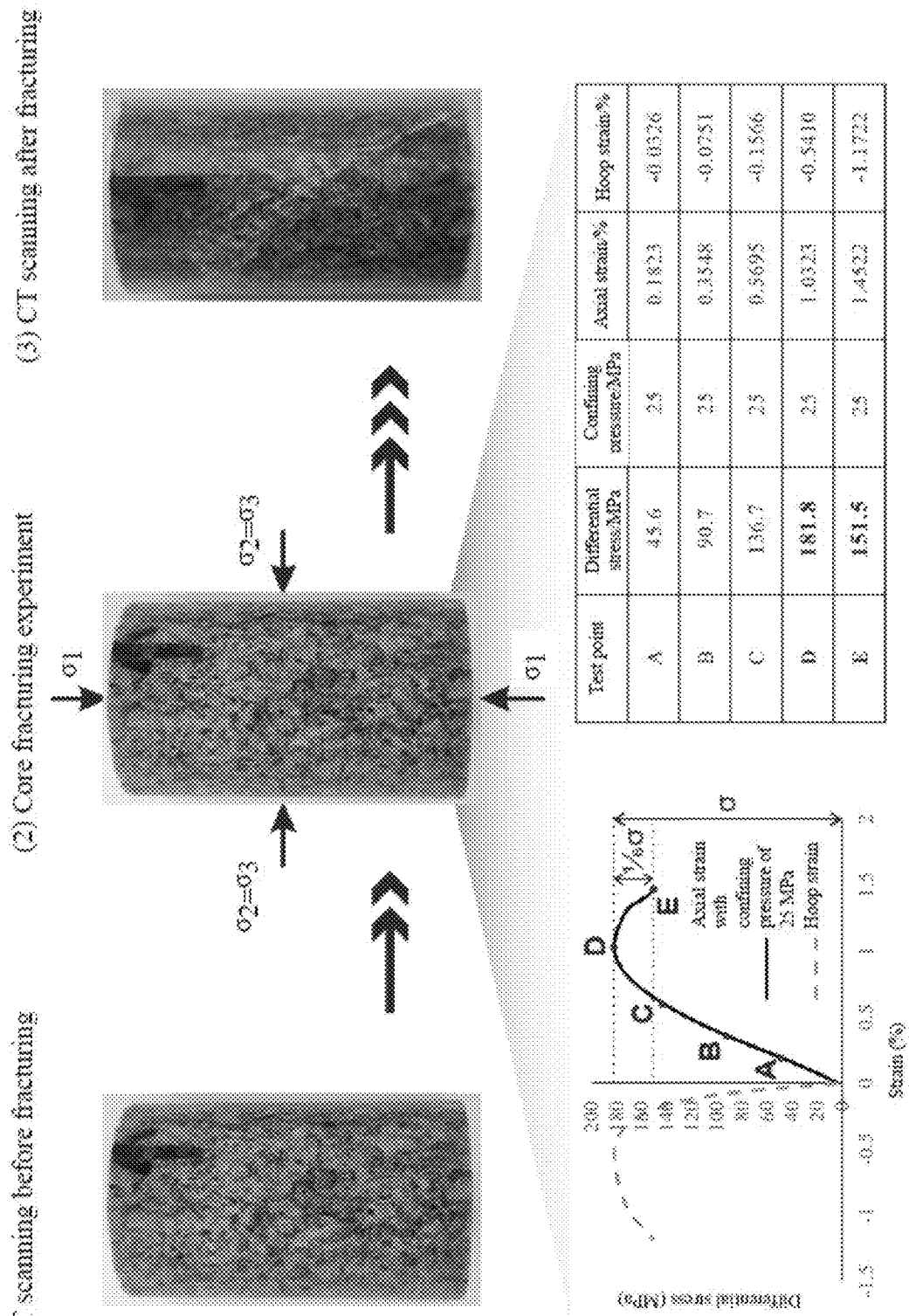
FIG. 6 is a design diagram of an experiment flow of core No. 1 according to an example of the present disclosure.

(4) The sample fractured by a triaxial rock mechanics experiment is put into the micro-CT scanning experimental instrument again, ensuring that the direction and position of sample placement are consistent with those in the scanning before fracturing. A scanning resolution is set to 10 μm/pixel, and the micro-CT scanning after core fracturing is performed. After the completion of scanning, the characteristics of micro-CT scanning slice are observed, and an XY direction slice with the same characteristics of micro-CT scanning slice before fracturing is selected to compare the fracture propagation after fracturing. An experimental design flow of core No. 1 is shown in FIG. 6.

Figure 7:
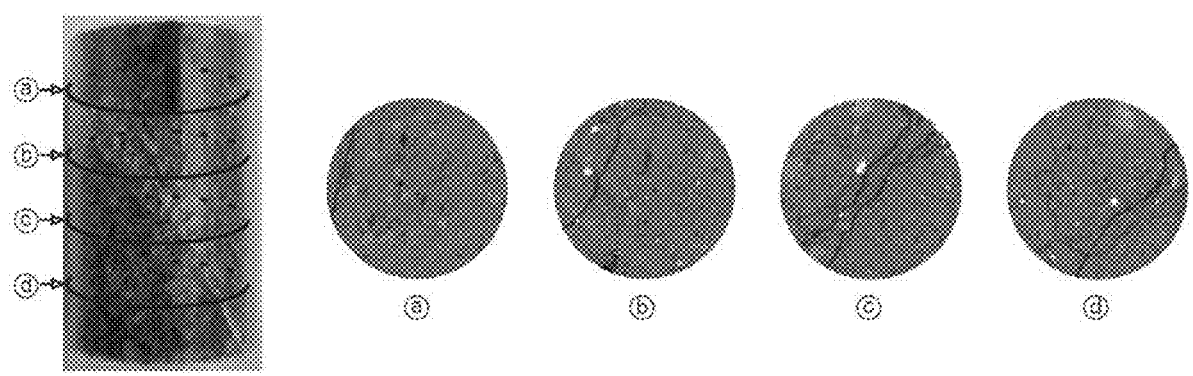
FIG. 7 is a fracturing fracture network propagation trend diagram of core No.1 according to an example of the present disclosure.

II. Micro-CT scanning images before and after fracturing are compared, fractures formed after fracturing are extracted and a fracture network generated after fracturing is accurately drawn out. Since a fracture generated by fracturing is a shear fracture, the distribution of fracturing fractures in a longitudinal direction is not uniform, and at this time, an image (FIG. 7c) near where a slice diameter is passed by the fracturing fractures is selected for data processing. A fracturing fracture network propagation trend diagram of core No. 1 is shown in FIG. 7.

III. Division of Dense Area and Pore Development Area

Pores are extracted by image numerical processing to calculate a surface porosity. The specific processing steps are as follows.

(1) CT scanning image optimization: a gray-scale image acquired by the core micro-CT scanning is represented by a gray-scale value of 0-255, pixel values of pixel points and eight adjacent pixel points thereabout in a digital image are

TABLE 1

| | | | | Basic data of experimental core | | | | |
|---|---|---|---|---|---|---|---|---|
| Serial number | Well number | Depth (m) | Length (cm) | Diameter (cm) | Porosity (%) | Permeability (mD) | Brittleness index (dimensionless) | Mobile fluid saturation before fracturing (%) |
| 1 | A | 4592 | 4.80 | 2.50 | 9.38 | 0.77 | 0.79 | 56.64 | selected, these pixel values are sorted in an ascending order, and then a pixel value located at a middle position of the sorting is taken as a pixel value of a current pixel point, thereby performing optimization processing on the image.

Figure 8:
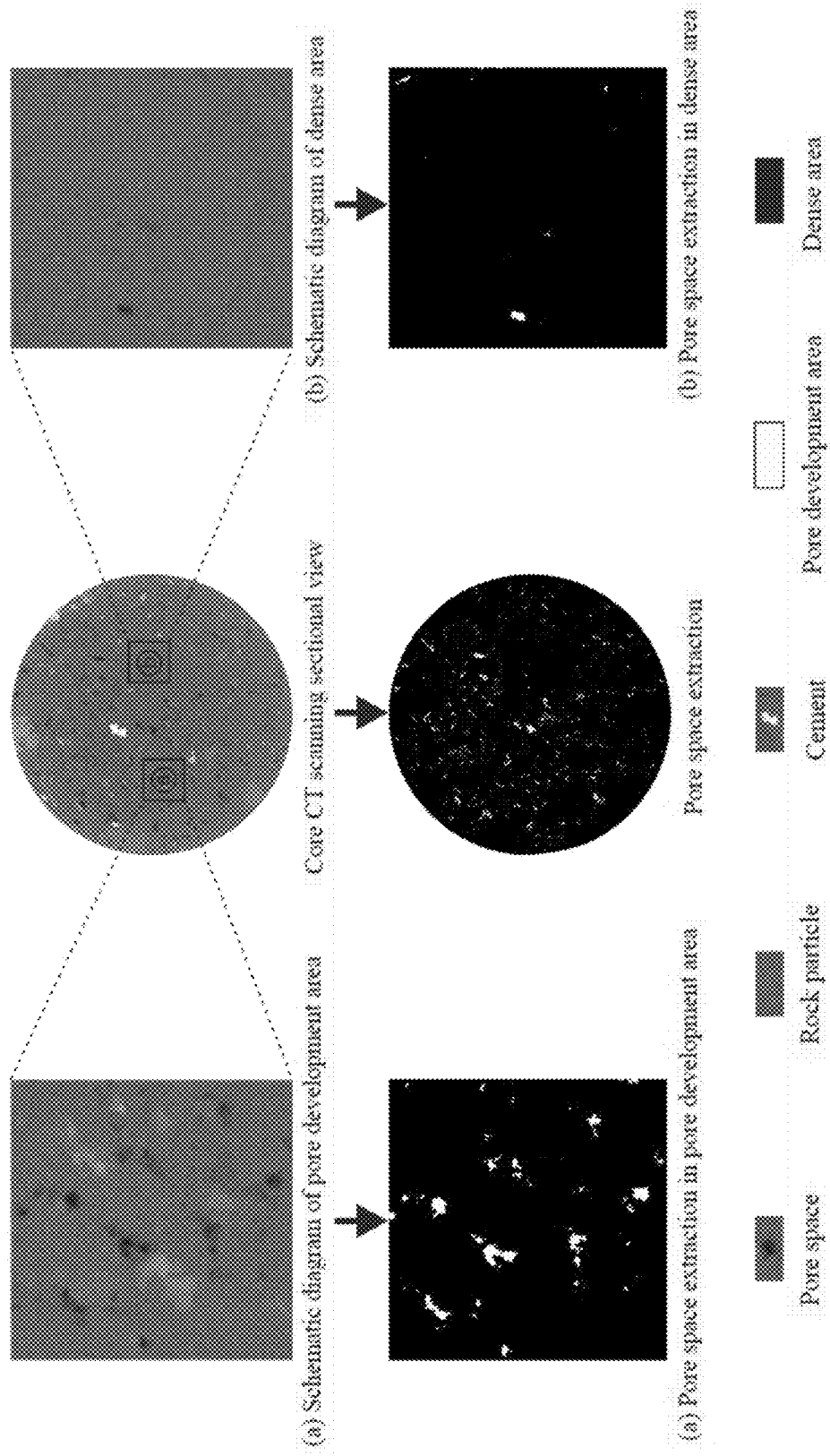
FIG. 8 is a schematic diagram of image pore space extraction of core No. 1 according to an example of the present disclosure.

(2) Pore space extraction: the information of pore space, rock skeleton and cement is extracted through the determination of gray-scale threshold, and a pore part in the image is segmented. The image pore extraction process of core No. 1 is shown in FIG. 8.

(3) Calculation of area surface porosity: a ratio of pixel values of all pores in the selected area to pixel values of the whole selected area is a surface porosity of the area.

(4) Division of dense area and pore development area: an area with an area surface porosity of $\Phi_{ap}$<3% is divided into a dense area, and an area with an area surface porosity of $\Phi_{ap}$≥3% is divided into a pore development area. Through calculation: the core No. 1 has 9.8% of dense area and 90.2% of pore development area.

IV. Division of Plane into a Plurality of Micro-Units by Gridding

Figure 9:
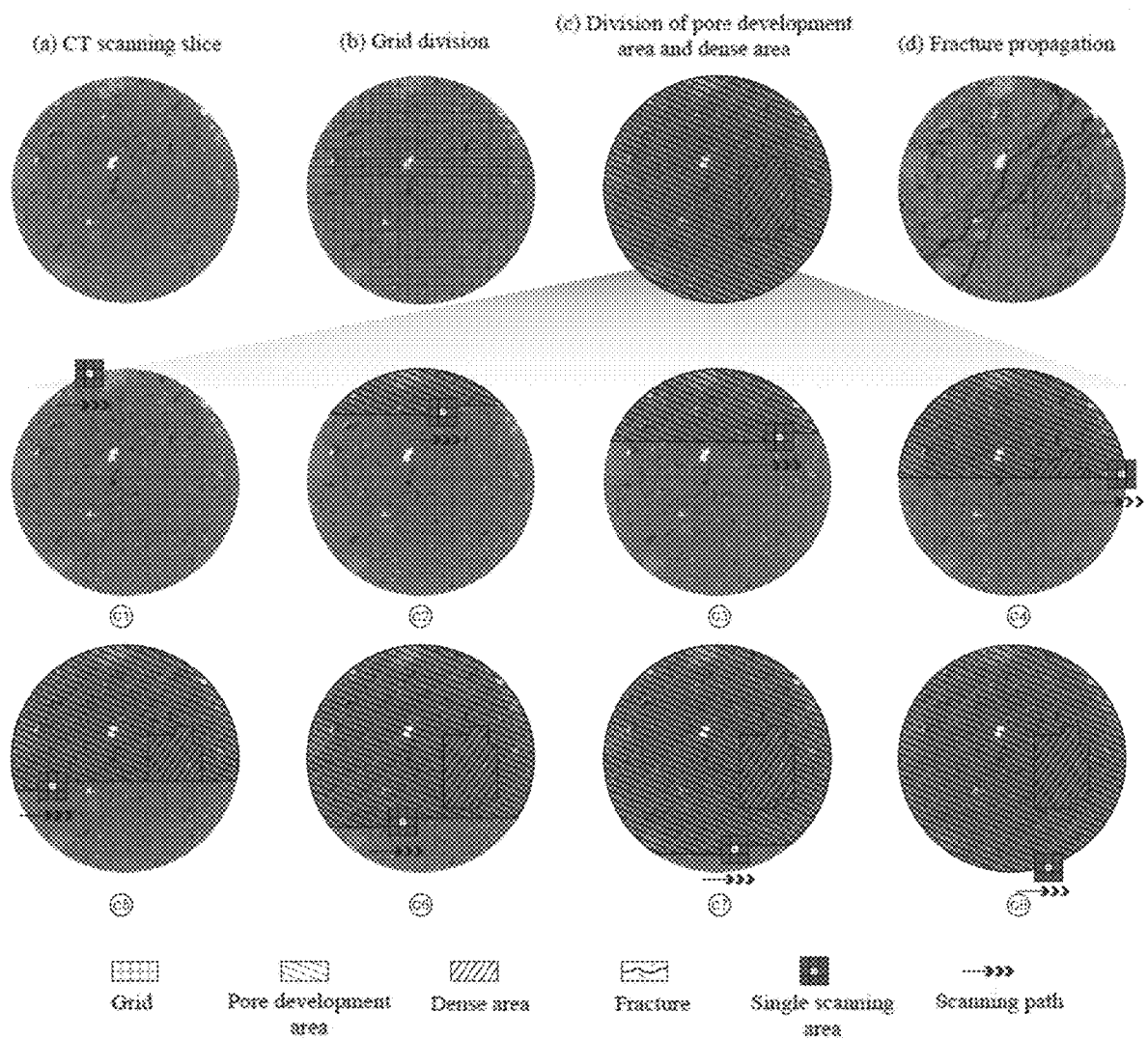
FIG. 9 is a flow chart of the analysis of fracturing fracture propagation of core No. 1 by netting analysis according to an example of the present disclosure.

By gridding, a tangent plane of core is divided into a plurality of micro-units with equal sizes, a dense area and a pore development area are divided, and the development morphology of fractures is observed. In the analysis process, an area of the tangent plane of core is expressed by the number of micro-units, and an area of fracture reconstruction space after fracturing can be expressed by the number of micro-units passed by the fracture network, to realize the quantitative calculation of an area of fracture reconstruction in plane. A flow chart of the analysis of fracturing fracture propagation of core No. 1 by netting analysis is shown in FIG. 9.

V. Calculation of Porosity of Fracturing Reconstruction

A porosity measured by core experiment is 9.38%, and the number of grids passed by fracturing fractures and the total number of grids occupied by the pore development area are calculated by using Formula (2) to obtain a porosity of fracturing reconstruction to be 3.21%.

VI. Calculation of Mobile Fluid Saturation after Fracturing

A mobile fluid saturation of an area not affected by fractures after fracturing remains consistent with that before fracturing, and a mobile fluid saturation of a pore space affected by fractures reaches a theoretical maximum value of 90%. A mobile fluid saturation of sample No. 1 before fracturing is 56.27% and a mobile fluid saturation after fracturing is 68.06% calculated by Formulas (3) and (4).

VII. Calculation of Mobile Fluid Saturation after Fracturing by Logging

A mobile fluid saturation after fracturing of the formation where the core is sampled can be acquired by netting analysis. If continuous mobile fluid saturations after fracturing of the formation are to be acquired, it is necessary to link the experimental data with the characteristics of a logging curve, to realize the logging calculation of mobile fluid saturation after fracturing.

Through the analysis and calculation of experimental data and logging data, the following results are obtained: in Well A, a=10.13, b=5.42, c=8.01, d=31.04, m=7.16, and n=3.94. By using Formula (6), it is calculated that a mobile fluid saturation of sample No. 1 before fracturing is 57.28%; by using Formula (7), it is calculated that an increment of mobile fluid saturation after fracturing is 9.60%; and by using Formula (8), it is calculated that a mobile fluid saturation after fracturing is 66.88%, and an absolute error is 1.18% compared with the results calculated by netting analysis.

Figure 10:
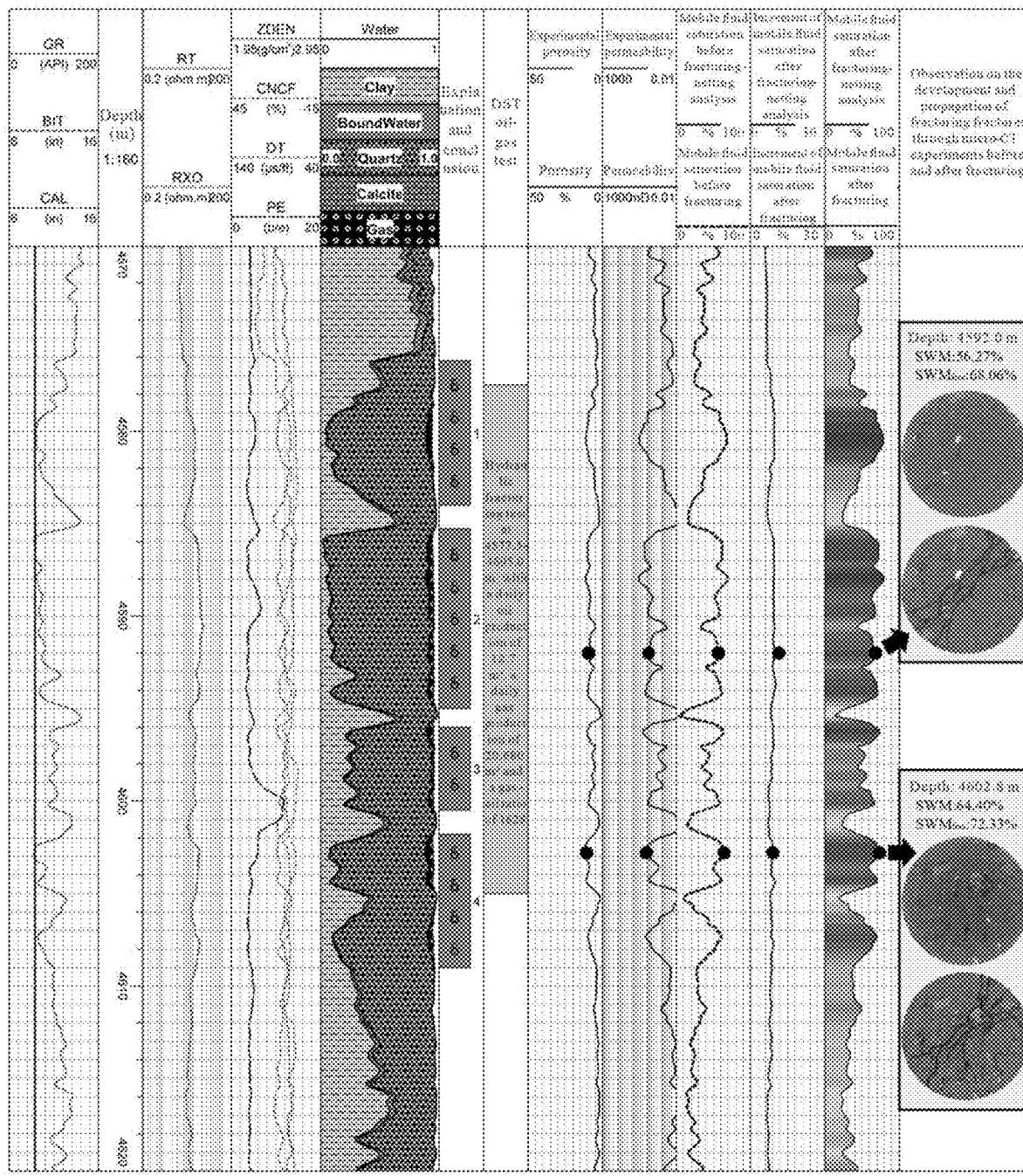
FIG. 10 is a schematic diagram of output curves of a mobile fluid saturation by logging calculation after fracturing according to an example of the present disclosure.

Output curves of logging calculation of mobile fluid saturation after fracturing are as shown in FIG. 10: at 4592.0 m, a mobile fluid saturation after fracturing calculated by netting analysis is $SWM_{frac}$=68.06%, and a mobile fluid saturation after fracturing calculated by logging is $SWM_{frac1}$=66.88%, with an absolute error of 1.18%; and at 4602.8 m, a mobile fluid saturation after fracturing calculated by netting analysis is $SWM_{frac}$=73.51%, and a mobile fluid saturation after fracturing calculated by logging is $SWM_{frac1}$=72.36%, with an absolute error of 1.15%.

Herein, specific examples are used to explain the principle and implementation of the present disclosure, and the description of the above examples is only used to help understand the method and its core idea of the present disclosure. At the same time, for those of ordinary skill in the art, many changes can be made in the specific implementations and application scopes according to the idea of the present disclosure. In summary, the contents of this specification are not to be construed as limiting the present disclosure.

The invention claimed is:

1. A calculation method for a mobile fluid saturation after reservoir fracturing based on netting analysis, comprising the following steps:

performing a fracturing experiment and micro-computed tomography (CT) experiment designs before and after fracturing on a reservoir core sample;

dividing a pore development area and a dense area for the reservoir core sample;

comparing micro-CT scanning experimental images of the same reservoir core sample before and after fracturing, and dividing a fracture network formed after fracturing;

analyzing the propagation of fracturing fractures by netting analysis on the basis of the fracture network;

determining a porosity of fracturing reconstruction on the basis of a number of grids passed by the fracturing fractures and a number of grids contained in the pore development area, the porosity of fracturing reconstruction being a ratio of the number of grids passed by the fracturing fractures to the number of grids contained in the pore development area multiplied by the core test porosity, expressed as:

$$\Phi_{frac} = \frac{N_{frac}}{N_{loose}} \times \Phi \quad (3)$$

where, $\Phi_{frac}$ is a porosity of fracturing reconstruction, %; $N_{frac}$ is the number of grids passed by the fracturing fractures; $N_{loose}$ is the number of grids contained in the pore development area; and $\Phi$ is the core test porosity, %;

further determining a mobile fluid saturation after fracturing on the basis of the porosity of fracturing reconstruction, comprising calculation formulas of the mobile fluid saturation after fracturing shown in Formulas (4) and (5):

$$\Delta SWM = \frac{\Phi_{frac}}{\Phi} \times (SWM_F - SWM) \quad (4)$$

$$SWM_{frac} = SWM + \Delta SWM \quad (5)$$

where, $\Delta SWM$ is an increment of the mobile fluid saturation after fracturing calculated by netting analysis, %;

SWM is a mobile fluid saturation before fracturing acquired by a nuclear magnetic resonance experiment, %; $SWM_{frac}$ is the mobile fluid saturation after fracturing calculated by netting analysis, %; since the fractures may not transform all immobile fluids in the pore space into mobile fluids due to the presence of a bound water membrane in the pore space, $SWM_F$ indicates a proportion of fluids in a reconstructable pore space when the fractures pass through, taking $SWM_F$=90%; Φfrac is a porosity of fracturing reconstruction, %; and Φ is a core test porosity, %; and combining with a logging curve to realize the continuous calculation of mobile fluid saturation after fracturing, comprising performing multivariate fitting on the mobile fluid saturation before fracturing with a reservoir quality factor through the porosity and permeability, as shown in Formula (6):

$$SWM1 = a\ \ln(\Phi) + b\ \ln(K) + c\left(\sqrt{\frac{K}{\Phi}}\right)^x + d \quad (6)$$

the increment of mobile fluid saturation after fracturing being directly related to a brittleness index, expressed by Formula (7):

$$\Delta SWM1 = mBI + n \quad (7)$$

the mobile fluid saturation after fracturing being calculated by adding the mobile fluid saturation before fracturing and the increment of mobile fluid saturation after fracturing, as shown in Formula (8):

$$SWM_{frac1} = SWM1 + \Delta SWM1 \quad (8)$$

where, SWM1 is a mobile fluid saturation before fracturing calculated by logging, %; Φ is a core test porosity, %; K is a core test permeability, mD; BI is a brittleness index; $SWM_{frac1}$ is a mobile fluid saturation after fracturing calculated by logging, %; ΔSWM1 is an increment of the mobile fluid saturation after fracturing calculated by logging, %; and a, b, c, d, m and n are fitting formula coefficients.

2. The calculation method for a mobile fluid saturation after reservoir fracturing based on netting analysis according to claim 1, wherein the performing a fracturing experiment and micro-CT experiment designs before and after fracturing on a reservoir core sample comprises:

sample selection and preparation: selecting a tight oil-gas reservoir section core as a reservoir core sample, and drilling the tight oil-gas reservoir section core into a cylinder with a set size, two end faces of the cylinder being flat and perpendicular to an axis;

a micro-CT scanning experiment before fracturing: acquiring an internal morphology and an internal microstructure of the core before fracturing through the micro-CT scanning experiment;

a fracturing experiment: simulating a formation hydraulic fracturing experiment through a laboratory triaxial rock mechanics experiment, and stopping pressing when a stress drops to a set range; and a micro-CT scanning experiment after fracturing: acquiring an internal morphology and an internal microstructure of the core after fracturing through the micro-CT scanning experiment.

3. The calculation method for a mobile fluid saturation after reservoir fracturing based on netting analysis according to claim 2, wherein the micro-CT scanning experiment after fracturing meets the following conditions:

a) the use of the same instrument as that used for the micro-CT scanning experiment before fracturing;

b) during the experiment, the direction and position of core placement to be consistent with those in the scanning before fracturing; and c) the selection of scanning resolution to be consistent with a scanning resolution before fracturing.

4. The calculation method for a mobile fluid saturation after reservoir fracturing based on netting analysis according to claim 2, wherein the fracturing experiment: simulating a formation hydraulic fracturing experiment through a laboratory triaxial rock mechanics experiment, and stopping pressing when a stress drops to a set range specifically comprises:

wrapping the reservoir core sample with a thermoplastic film and putting a wrapped reservoir core sample into a triaxial mechanical experiment tester when the triaxial rock mechanics experiment is carried out, an experimental confining pressure being set to $\sigma_3 = P_f$ if a formation pressure of a depth section where a test core is located is $P_f$ when a triaxial rock mechanics test is carried out; and dividing an axial strain curve into several segments according to curve characteristics, an OA segment belonging to elastic deformation; a stress-strain relationship in an AB segment basically being linear, and a strain being completely recovered after stress unloading; in a BC segment, the curve deviating from linearity and plastic deformation occurring; and in a CD segment, an interior of the rock having an accelerated crack formation speed and an increased crack density, at this time, an axial pressure being slowly applied, a stress-strain curve output by software being observed simultaneously, the axial strain curve reaching a maximum stress at point D, being the maximum bearing capacity of rock, and the stress at this time being recorded as $\sigma_{max}$; and stopping pressing when a stress drops by $1/6\sigma_{max} - 1/5\sigma_{max}$.

5. The calculation method for a mobile fluid saturation after reservoir fracturing based on netting analysis according to claim 1, wherein the dividing a pore development area and a dense area for the reservoir core sample comprises:

optimizing the micro-CT scanning experimental image of the reservoir core sample before fracturing;

transforming the micro-CT scanning experimental image before fracturing into a gray-scale image, and determining a segmentation threshold point to extract the information of pore space and rock skeleton;

determining a ratio of a pixel value occupied by all pores in a scanning area to a pixel value of the whole scanning area as a surface porosity of the area; and dividing an area with a surface porosity $\Phi_{ap} < 3\%$ in the scanning area into a dense area, and dividing an area with a surface porosity $\Phi_{ap} \geq 3\%$ in the scanning area into a pore development area.

6. The calculation method for a mobile fluid saturation after reservoir fracturing based on netting analysis according to claim 5, wherein the transforming the micro-CT scanning experimental image before fracturing into a gray-scale image, and determining a segmentation threshold point to extract the information of pore space and rock skeleton comprises:

transforming the micro-CT scanning experimental image before fracturing into a gray-scale image, which is divided into 256 gray-scale values from 0 to 255;

segmenting pores in the micro-CT scanning experimental image before fracturing from a rock skeleton and a cement to cause a ratio of porosity pixels to total pixels in the segmented core image to be equal to a core porosity, a calculation formula of the selected segmentation threshold point when the pore space is extracted being shown in Formula (1):

$$f(n) = \frac{\Phi}{100} - \frac{\sum_{i=0}^{n} p(i)}{\sum_{i=0}^{255} p(i)} \quad (1)$$

where, f(n) is a discriminant formula of a segmentation threshold, a value of n being expressed as a gray-scale threshold segmentation point if f(n)=0; Φ is a core test porosity, %; i is a gray-scale value; and p (i) is the number of pixels with a gray-scale value of i.

7. The calculation method for a mobile fluid saturation after reservoir fracturing based on netting analysis according to claim 1, wherein the analyzing the propagation of fracturing fractures by netting analysis on the basis of the fracture network comprises:

selecting a certain tangent plan view of micro-CT scanning after fracturing;

dividing the tangent plan view into a plurality of micro-units with equal sizes by a square grid with a side length of 1 mm;

scanning each grid by line with a step length of 1 mm according to the divided grids; and scanning the surrounding 3 mm×3 mm area with a total of 9 grids by taking a grid to be scanned as a center when each grid is scanned, a ratio of a pixel value occupied by all pores in the scanning area to a pixel value of the whole scanning area being a surface porosity of the area, and a calculation formula being shown in Formula (2):

$$\Phi_{ap} = \frac{N_\phi}{N} \times 100\% \quad (2)$$

where, $\Phi_{ap}$ is an area surface porosity (%), N is a sum of pixels in the selected area (dimensionless), and No is a sum of pixels occupied by pore space in the selected area (dimensionless), the scanned grids belonging to the pore development area being determined if the surface porosity in the scanning area is $\Phi_{ap}>3\%$, and the scanned grids belonging to the dense area being determined if the surface porosity in the scanning area is $\Phi_{ap}\leq 3\%$ until all areas are scanned; and observing a micro-CT scanning image after fracturing, and drawing out the propagation of fracturing fractures in the core.

8. The calculation method for a mobile fluid saturation after reservoir fracturing based on netting analysis according to claim 7, wherein the determining a porosity of fracturing reconstruction on the basis of the number of grids passed by the fracturing fractures and the number of grids contained in the pore development area comprises:

uniformly recording a grid with an area of <0.5 mm2 as 0 and a grid with an area of >0.5 mm2 as 1 in the subsequent calculation because many incomplete grids exist on an edge after grid division.

* * * * *